United States Patent

Goto et al.

Patent Number: 5,620,777
Date of Patent: Apr. 15, 1997

[54] POROUS RUBBER STAMP MATERIAL HAVING OPEN CELLS

[75] Inventors: Kazumi Goto; Shigehiro Sasaki, both of Yokohama, Japan

[73] Assignee: Mitsubishi Pencil Kabushiki Kaisha, Tokyo, Japan

[21] Appl. No.: 341,427

[22] Filed: Nov. 17, 1994

[30] Foreign Application Priority Data

Nov. 30, 1993 [JP] Japan .................................. 5-299807

[51] Int. Cl.⁶ ...................................................... B32B 3/12
[52] U.S. Cl. ........................ 428/158; 428/141; 428/163; 428/174; 428/304.4; 428/313.5; 428/492
[58] Field of Search ..................... 428/195, 141, 428/158, 163, 174, 304.4, 313.5, 492

[56] References Cited

U.S. PATENT DOCUMENTS 5,397,417  3/1995  Goto et al. ............................ 156/272.8

FOREIGN PATENT DOCUMENTS 48-41936  12/1973  Japan .
59-16945   4/1984   Japan .
59-28193   7/1984   Japan .
6-191002   7/1994   Japan .

OTHER PUBLICATIONS

*Physical Testing Method for Expanded Rubber*, The Society of Rubber Industry, Japan Standard, SRIS 0101–1968 (English translation included).

Primary Examiner—William Krynski
Attorney, Agent, or Firm—Darby & Darby

[57] ABSTRACT

A porous rubber stamp material having open cells is here disclosed which comprises a print layer 2 having a spring hardness of 30 to 40 and an ink-occluding layer 1 having a spring hardness of 10 to 20, and preferably, the ink-occluding layer 1 is provided with lugs 3. The porous rubber stamp material of the present invention can overcome faults of a conventional porous rubber stamp material having open cells and permits obtaining a very sharp imprint under any push pressure. Thus, the porous rubber stamp material of the present invention can be used for the continuous sealing of a private seal, an address seal, a date seal and the like.

3 Claims, 2 Drawing Sheets

POROUS RUBBER STAMP MATERIAL HAVING OPEN CELLS

BACKGROUND OF THE INVENTION (i) Field of the Invention

The present invention relates to a porous rubber stamp material having open cells for use in a private seal, an address seal, a date seal and the like. More specifically, it relates to a sponge rubber stamp material having numerous open cells from which a rubber stamp is made, and by this rubber stamp, an ink can be beforehand occluded, so that a seal can be put without using any ink pad.

(ii) Description of the Related Art

As stamps which can be used to continuously put a seal without using an ink pad every sealing operation, the stamps made of a sponge rubber stamp material having numerous open cells have been spread.

For example, Japanese Patent Publication No. (Sho) 48-41936 discloses a method for obtaining a rubber stamp by superposing a sheet A upon another sheet B, followed by vulcanization.

That is to say, a material rubber is mixed with a vulcanizing agent, a filler and a high-temperature closed cells-forming agent, and sodium chloride and sodium naphthalenesulfonate-formalin condensate are further added thereto, followed by mastication, to prepare the sheet A. On the other hand, the above-mentioned material rubber is mixed with the vulcanizing agent, the filler, a low-temperature closed cells-forming agent, an intermediate-temperature closed cells-forming agent and the high-temperature closed cells-forming agent, and sodium chloride and sodium naphthalenesulfonate-formalin condensate are further added thereto, followed by mastication, to prepare the sheet B.

Next, the sheet A is closely superposed upon the sheet B, and the laminate is then placed in a mold having an inside bottom surface provided with relief characters, and a pressure of about 200 kg/cm$^2$ is applied to the mold so that the sheet A may be pressed against the relief characters. Afterward, vulcanization is carried out at a gradually rising temperature, and a molded article is then released from the mold, washed until sodium chloride or sodium sulfate and sodium naphthalenesulfonate-formalin condensate are removed, dehydrated, and then dried to prepare the rubber stamp.

Furthermore, Japanese Patent Publication No. (Sho) 59-28193 discloses that the sheet A is formed by adding sodium chloride, sodium sulfate or sodium nitrate of 200 to 350 mesh and soluble potato starch of 800 to 200 mesh pass to an unvulcanized rubber blend, and the sheet B is formed by adding sodium chloride, sodium sulfate or sodium nitrate of 32 to 100 mesh and soluble potato starch of 150 to 250 mesh to the unvulcanized rubber blend, and these sheets are then treated in the abovementioned manner to prepare a rubber stamp.

These methods all comprise a technique in which the sheet A is brought into contact with the mold having the relief characters, and the sheets are then pressed between hot platens to form the rubber stamp.

Most of these conventional porous rubber stamps are each prepared by laminating a print layer having a spring hardness of 20 to 30 (a measured value by a spring hardness testing machine; THE SOCIETY OF RUBBER INDUSTRY, JAPAN STANDARD SRIS 0101-1968) on the surface of an ink-occluding layer having a spring hardness of 10 to 20. Thus, when an excess push pressure is applied to the print member at the time of sealing, a print surface is crushed and the occluded ink excessively flows out, with the result that an imprint blurs and any sharp imprint cannot be obtained.

In addition, another porous rubber stamp material is also on the market in which a skin layer is formed on the surface of the print layer to decrease the diameter of cells through which the ink flows out. However, the stamps manufactured from this porous rubber stamp material have a noticeable unevenness, and when the excess push pressure is applied to the stamp at the sealing, the print surface is crushed and the occluded ink excessively flows out, so that the imprint blurs and any sharp imprint cannot be obtained. Conversely, the ink does not sufficiently flow, though no blur is present, and hence, when a sealing operation is continuously carried out, the problem of scratch inconveniently occurs soon.

SUMMARY OF THE INVENTION

An object of the present invention is to provide a porous rubber stamp material having open cells which can obtain a sharp imprint without blur, and thus, according to the present invention, the above-mentioned problems can be solved.

The present inventors have intensively researched with the intention of solving the above-mentioned problems, and as a result, it has been found that a porous rubber stamp material having open cells capable of providing a blur-free sharp imprint can be obtained by specifying the hardness of a print layer and an ink-occluding layer and forming lugs on the outer bottom surface of the ink-occluding layer. In consequence, the present invention has now been completed.

That is to say, a porous rubber stamp material having open cells of the present invention is characterized by comprising a print layer having a spring hardness of 30 to 40 and an ink-occluding layer having a spring hardness of 10 to 20.

Preferably, lugs are formed on the outer bottom surface of the ink-occluding layer so as to occupy 15 to 30% of the outer bottom surface area of the ink-occluding layer.

Figure 1:
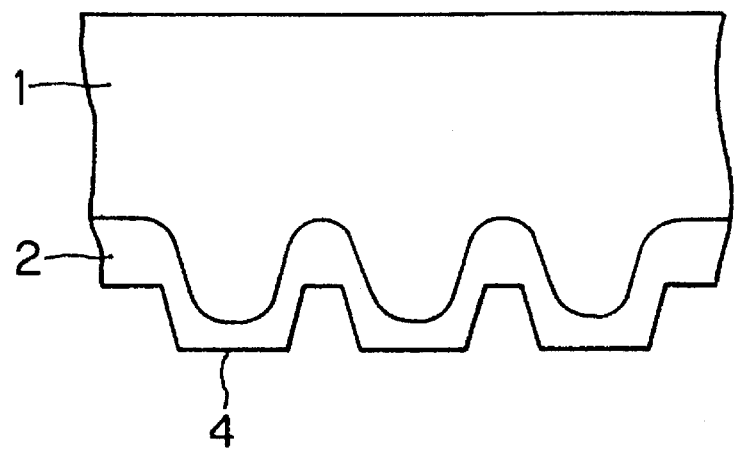
FIG. 1 is a sectional view of a porous rubber stamp material of the present invention (Example 1).

1. ink-occluding layer
2. print layer
3. lug
3'. lug at the time of sealing
4. print surface
4'. print surface at the time of sealing

DETAILED DESCRIPTION OF THE INVENTION

A porous rubber stamp material of the present invention will be prepared as follows.

In the first place, a vulcanizing agent, a filler, an aging inhibitor and a softener are blended with a material rubber so that a spring hardness (a measured value by a spring hardness testing machine; THE SOCIETY OF RUBBER INDUSTRY, JAPAN STANDARD SRIS 0101-1968) after vulcanization may be in the range of 30 to 40, and the blend is then kneaded by a kneader to prepare a rubber composition A. Afterward, a water-easily soluble powder is added to this composition A, and the mixture is masticated, kneaded, and then rolled by calender rolls or the like to form an unvulcanized print layer sheet (hereinafter referred to as "print layer sheet").

Next, the vulcanizing agent, the filler, the aging inhibitor and the softener are blended with the material rubber so that the spring hardness after the vulcanization may be in the range of 10 to 20, and the blend is then kneaded by the kneader to prepare a rubber composition B. Afterward, the water-easily soluble powder is added to this composition B, and the mixture is kneaded, and then rolled by calender rolls or the like to form an unvulcanized ink-occluding layer sheet (hereinafter referred to as "ink-occluding layer sheet").

On the other hand, in order to superpose and integrate both the sheets, a mold is prepared which has an inner bottom surface provided with the relief of desired characters or figures and a smooth upper bottom surface.

Next, the print layer sheet is placed in the mold so as to bring the sheet into contact with the inner bottom surface thereof, and the ink-occluding layer sheet is then placed therein so as to superpose the ink-occluding layer sheet upon the stamp layer sheet. Afterward, these sheets are vulcanized and integrally molded at a temperature of 150° to 180° C. under a pressure of 100 to 200 kg/cm$^2$ for 5 to 20 minutes.

After the integral molding, the molded article is sufficiently washed with cold water or warm water to remove the water-easily soluble powder therefrom, and it is then dried to obtain a porous stamp material having open cells which comprises a print layer and a ink-occluding layer.

In the case that lugs are formed on the ink-occluding layer of the rubber stamp material, the mold having the upper bottom surface provided with the desired lugs is prepared.

With regard to a blend ratio of the respective materials for the preparation of both the unvulcanized sheets, 100 parts of the material rubber is blended with 0.3 to 5 parts by weight of the vulcanizing agent, 50 to 110 parts by weight of the filler, 1 to 3 parts by weight of the aging inhibitor and 5 to 20 parts by weight of the softener to prepare the rubber composition. The amount of the water-easily soluble powder to be added to the print layer sheet is in the range of 70 to 240% by volume based on 100% by volume of the above-mentioned rubber composition, and the amount of the water-easily soluble powder to be added to the ink-occluding layer sheet is in the range of 100 to 400% by volume based on 100% by volume of the above-mentioned rubber composition.

Examples of the water-easily soluble powder for use in both the unvulcanized sheets include sodium chloride, sodium sulfate, potassium carbonate, aluminum sulfate, sodium nitrate, and the like.

Examples of the vulcanizing agent include sulfur and its homologous elements (selenium and tellurium) as well as usually usable compounds such as sulfur-containing organic compounds, organic peroxides, metal oxides (MgO, PbO, ZnO and the like) and organic polyvalent amines. In addition, a vulcanizing accelerator such as tetramethylthiuram disulfide or n-cyclohexyl-2-benzothiazole sulfenamide is used.

Examples of the filler include calcium carbonate, colloidal clay, silicon dioxide, carbon black, barium sulfate, magnesium carbonate, and the like.

Examples of the aging inhibitor include aromatic amines, hydroquinones and aldehydeamine condensates.

Examples of the softener include process oil, pine tar, dibutyl phthalate, tricresyl phosphate, and the like.

Examples of the material rubber include natural rubbers and synthetic rubbers such as styrene, butadiene rubber (SBR), butadiene-acrylonitrile rubber (NBR), isoprene rubber, chloroprene, and the like.

The lugs 3 on the ink-occluding layer 1 of the porous stamp material of the present invention suitably occupy 15 to 30% of the outer bottom surface area of the ink-occluding layer 1, and the lugs 3 take any shape such as column, lattice, parallel and the like, but it is necessary that the lugs are uniformly arranged on the outer bottom surface of the ink-occluding layer 1. The preferable examples are the columnar lugs having circular, square, polygonal sections and the like, and a trapezoidal shape is also acceptable. The sectional area of each columnar lug is preferably in the range of 0.12 to 1.13 mm$^2$.

In the porous rubber stamp material having the open cells of the present invention, the spring hardness of the print layer 2 is set to 30–40, and that of the ink-occluding layer 1 is set to 10–20. Therefore, in the case that the porous rubber stamp material is attached to a holder and then used as a stamp occluding an ink, a print portion is not crushed even when push pressure is applied thereto, and the ink-occluding layer always exerts suitable cushion properties to give a comfortable seal feeling. As a result, a sharp imprint can be obtained without any blur and any thickening of the sealed characters.

If the spring hardness of the print layer 2 is less than 30, a print surface 4 is crushed, so that any sharp imprint cannot be obtained. Conversely, if it is more than 40 and if the print surface 4 is not parallel to a surface on which the characters are sealed, part of the characters are not sealed, i.e., the so-called partial seal phenomenon occurs, though the print layer 2 is not crushed.

If the spring hardness of the ink-occluding layer is less than 10, the structure strength of the rubber stamp material is low, and its durability is also poor. Conversely, if it is more than 20, the ink-occluding layer cannot exert the suitable cushion properties, so that the print portion is crushed and the sealed characters blur and thicken, with the result that any sharp imprint cannot be obtained.

In the case that the lugs 3 are arranged on the bottom surface of the ink-occluding layer 1 which is a porous rubber layer, the lugs 3 occupy 15 to 30% of the bottom surface area of the layer, and the sectional area of each lug is in the range of 0.12 to 1.13 mm$^2$. Therefore, even if an excess push pressure is applied, the print portion is not crushed, and the ink-occluding layer and the lugs on the bottom of the ink-occluding layer always exert the suitable cushion properties, with the result that the comfortable seal feeling can be obtained.

As a result, the very sharp imprint can be obtained without any blur and any thickening of the sealed characters.

The porous rubber stamp material having open cells of the present invention can overcome conventional faults, and permits obtaining a very sharp imprint under any push pressure. Thus, the porous rubber stamp material of the present invention can be used for the continuous sealing of a private seal, an address seal, a date seal and the like.

Now, the present invention will be described in more detail with reference to examples, but the scope of the present invention should not be limited to these examples.

EXAMPLE 1

To 100 parts by weight of a synthetic rubber (NBR) were added 0.3 part by weight of sulfur, 5 parts by weight of zinc white, 2 parts by weight of tetramethylthiuram disulfide, 2 parts by weight of n-cyclohexyl-2-benzothiazole sulfonamide, 8 parts by weight of dioctyl phthalate (DOP), 75 parts by weight of carbon black and 2 parts by weight of diphenylamineacetone condensate, followed by kneading, to form a rubber composition A. Afterward, 600 parts by volume of sodium chloride having a particle diameter of 0.030–0.060 mm was added to 100 parts by volume of this rubber composition A, and the mixture was then masticated and kneaded to form a print layer sheet having a thickness of 1.5 mm.

Similarly, to 100 parts by weight of a synthetic rubber (NBR) were added 0.3 part by weight of sulfur, 5 parts by weight of zinc white, 2 parts by weight of tetramethylthiuram disulfide, 2 parts by weight of n-cyclohexyl-2-benzothiazole sulfonamide, 8 parts by weight of DOP, 75 parts by weight of carbon black and 2 parts by weight of diphenylamine-acetone condensate, followed by kneading, to form a rubber composition B. Afterward, 700 parts by volume of sodium chloride having a particle diameter of 0.090–0.30 mm was added to 100 parts by volume of this rubber composition B, and the mixture was then kneaded to form an ink-occluding layer sheet having a thickness of 3.5 mm.

Next, a mold for stamp molding comprising a print surface provided with the relief of desired characters or figures and an ink-occluding layer surface having a smooth surface was prepared, and the print layer sheet was superposed upon the ink-occluding layer sheet so that the print layer sheet might come in contact with the print surface and so that the ink-occluding layer sheet might come in contact with the ink-occluding layer surface, and vulcanization and the integral molding of both the sheets were then carried out. This vulcanization was carried out at 150° C. under 150 kg/cm$^2$ for 15 minutes.

After the integral molding, the molded article was sufficiently washed with cold water or warm water to remove the contained sodium chloride powder therefrom, and then dried to obtain a porous rubber stamp material having open cells as shown in FIG. 1 in which a print layer having a spring hardness of 35 was laminated on an ink-occluding layer 1 having a spring hardness of 15.

A pigment ink of 400 to 1,500 mPa·s was occluded by the ink-occluding layer off this porous rubber stamp material to fill the ink-occluding layer with the ink, and sealing was then given. In this case, a print portion was not crushed even when push pressure was applied, and the ink-occluding layer always exerted suitable cushion properties, so that a sharp imprint could be obtained without any blur and any thickening of the sealed characters.

EXAMPLE 2

To 100 parts by weight of a synthetic rubber (NBR) were added 0.3 part by weight of sulfur, 5 parts by weight of zinc white, 2 parts by weight of tetramethylthiuram disulfide, 2 parts by weight of n-cyclohexyl-2-benzothiazole sulfonamide, 8 parts by weight of DOP, 75 parts by weight of carbon black and 2 parts by weight of diphenylamine-acetone condensate, followed by kneading, to form a rubber composition A. Afterward, 600 parts by volume of sodium chloride having a particle diameter of 0.030–0.060 mm was added to 100 parts by volume of this rubber composition A, and the mixture was then masticated and kneaded to form a print layer sheet having a thickness of 1.5 mm.

Similarly, to 100 parts by weight of a synthetic rubber (NBR) were added 0.3 part by weight of sulfur, 5 parts by weight of zinc white, 2 parts by weight of tetramethylthiuram disulfide, 2 parts by weight of n-cyclohexyl-2-benzothiazole sulfonamide, 8 parts by weight of DOP, 75 parts by weight of carbon black and 2 parts by weight of diphenylamine-acetone condensate, followed by kneading, to form a rubber composition B. Afterward, 700 parts by volume of sodium chloride having a particle diameter of 0.090–0.30 mm was added to 100 parts by volume of this rubber composition B, and the mixture was then kneaded to form an ink-occluding layer 1 sheet having a thickness of 3.5 mm.

Next, a mold for stamp molding was prepared which comprised a print surface 4 provided with the relief of desired characters or figures and an ink-occluding layer surface provided with cylindrical lugs 3 having a diameter of 0.5 mm and a height of 0.6 mm at a pitch of 2 mm, and the print layer sheet was superposed upon the ink-occluding layer sheet so that the print layer sheet might come in contact with the print surface and so that the ink-occluding layer sheet might come in contact with the ink-occluding layer surface, and vulcanization and the integral molding of both the sheets were then carried out. This vulcanization was carried out at 150° C. under 150 kg/cm$^2$ for 15 minutes.

Figure 2:
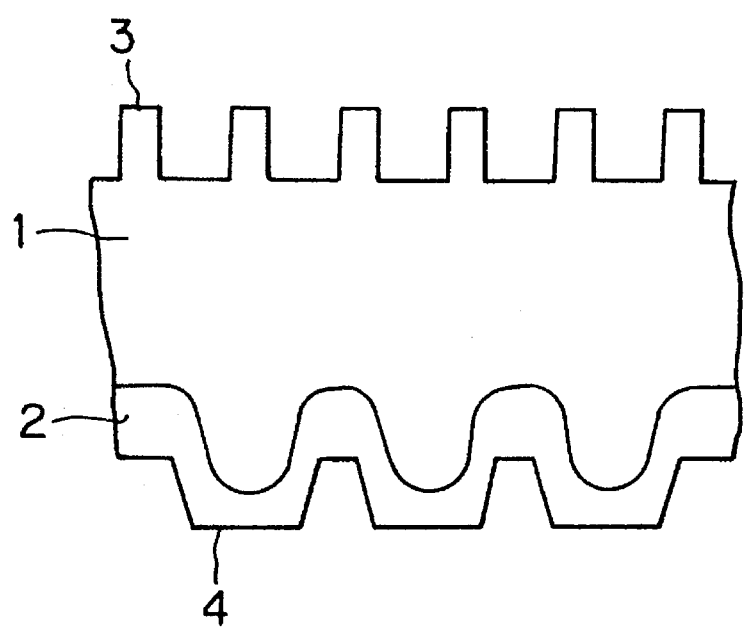
FIG. 2 is a sectional view of another porous rubber stamp material having lugs on an ink-occluding layer according to the present invention (Example 2).

After the integral molding, the molded article was sufficiently washed with cold water or warm water to remove the contained sodium chloride powder therefrom, and then dried to obtain a porous rubber stamp material having open cells as shown in FIG. 2 in which a print layer 2 having a spring hardness of 35 was laminated on an ink-occluding layer 1 having a spring hardness of 15.

Figure 3:
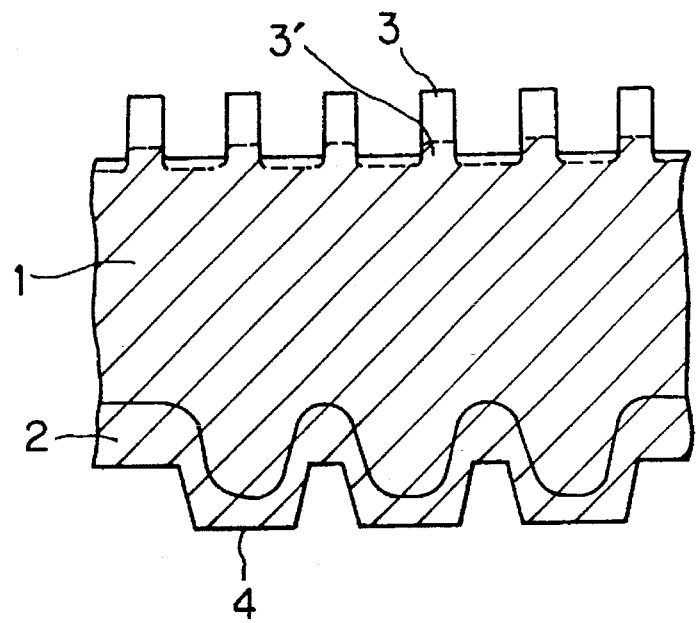
FIG. 3 is a sectional view of a rubber stamp made of the porous rubber stamp material shown in FIG. 2 at the time of sealing.

A pigment ink of 400 to 1,500 mPa·s was occluded by the ink-occluding layer of this porous rubber stamp material to fill the ink-occluding layer with the ink, and sealing was then given (see FIG. 3). In this case, a print portion was not crushed (see 4 of FIG. 3) even when push pressure larger than in Example 1 was applied, and the ink-occluding layer always exerted suitable cushion properties, so that a sharp imprint could be obtained without any blur and any thickening of the sealed characters.

Comparative Example 1

To 100 parts by weight of a synthetic rubber (NBR) were added 0.3 part by weight of sulfur, 5 parts by weight of zinc white, 2 parts by weight of tetramethylthiuram disulfide, 2 parts by weight of n-cyclohexyl-2-benzothiazole sulfonamide, 8 parts by weight of DOP, 75 parts by weight of carbon black and 2 parts by weight of diphenylamine-acetone condensate, followed by kneading, to form a rubber composition A. Afterward, 600 parts by volume of sodium chloride having a particle diameter of 0.030–0.060 mm was added to 100 parts by volume of this rubber composition A, and the mixture was then masticated and kneaded to form a print layer sheet having a thickness of 1.5 mm.

Similarly, to 100 parts by weight of a synthetic rubber (NBR) were added 0.3 part by weight of sulfur, 5 parts by weight of zinc white, 2 parts by weight of tetramethylthiuram disulfide, 2 parts by weight of n-cyclohexyl-2-benzothiazole sulfonamide, 7 parts by weight of DOP, 85 parts by weight of carbon black and 2 parts by weight of diphenylamine-acetone condensate, followed by kneading, to form a rubber composition B. Afterward, 650 parts by volume of sodium chloride having a diameter of 0.090–0.30 mm was added to 100 parts by volume of this rubber composition B, and the mixture was then kneaded to form an ink-occluding layer sheet having a thickness of 3.5 mm.

Next, integral molding was carried out in the same manner as in Example 1.

After the integral molding, the molded article was sufficiently washed with cold water or warm water to remove the contained sodium chloride powder therefrom, and then dried to obtain a porous rubber stamp material having open cells in which a print layer having a spring hardness of 35 was laminated on an ink-occluding layer having a spring hardness of 25.

Afterward, a pigment ink of 400 to 1,500 mPa·s was occluded by the ink-occluding layer of this porous rubber stamp material to fill the ink-occluding layer with the ink, and sealing was then Given. When push pressure was applied, a print portion was crushed, the sealed characters blurred and thickened, so that any sharp imprint could not be obtained.

Comparative Example 2

To 100 parts by weight of a synthetic rubber (NBR) were added 0.3 part by weight of sulfur, 5 parts by weight of zinc white, 2 parts by weight of tetramethylthiuram disulfide, 2 parts by weight of n-cyclohexyl-2-benzothiazole sulfonamide, 8 parts by weight of DOP, 75 parts by weight of carbon black and 2 parts by weight of diphenylamine-acetone condensate, followed by kneading, to form a rubber composition A. Afterward, 600 parts by volume of sodium chloride having a particle diameter of 0.030–0.060 mm was added to 100 parts by volume of this rubber composition A, and the mixture was then masticated and kneaded to form a print layer sheet having a thickness of 1.5 mm.

Similarly, to 100 parts by weight of a synthetic rubber (NBR) were added 0.3 part by weight of sulfur, 5 parts by weight of zinc white, 2 parts by weight of tetramethylthiuram disulfide, 2 parts by weight of n-cyclohexyl-2-benzothiazole sulfonamide, 7 parts by weight of DOP, 85 parts by weight of carbon black and 2 parts by weight of diphenylamine-acetone condensate, followed by kneading. Afterward, 650 parts by volume of sodium chloride having a diameter of 0.090–0.30 mm was added thereto, and the mixture was then kneaded to form an ink-occluding layer sheet having a thickness of 3.5 mm.

Next, integral molding was carried out in the same manner as in Example 2.

After the integral molding, the molded article was sufficiently washed with cold water or warm water to remove the contained sodium chloride powder therefrom, and then dried to obtain a porous rubber stamp material having open cells in which a print layer 2 having a spring hardness of 35 was laminated on an ink-occluding layer 1 having a spring hardness of 25.

Figure 4:
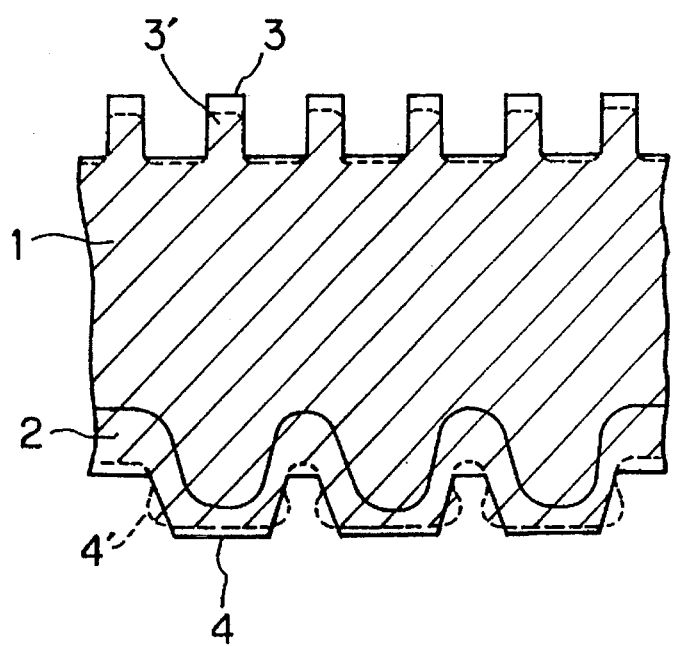
FIG. 4 is a sectional view of a rubber stamp made of a conventional porous rubber stamp material at the time of sealing (Comparative Example 2).

Afterward, this porous rubber stamp material was filled with a pigment ink of 400 to 1,500 mPa·s, and sealing was then given. When push pressure was applied as shown in FIG. 4, a print portion was crushed 4, the sealed characters blurred and thickened, so that any sharp imprint could not be obtained.

The reason why any sharp imprint could not be obtained in Comparative Examples 1 and 2 is that the hardness of the ink-occluding layer is high and hence suitable cushion properties cannot be exerted, so that the print portion is crushed.

What is claimed is:

1. A porous rubber stamp material having open cells which comprises a print layer having a spring hardness of greater than 30 and less than or equal to 40 and an ink-occluding layer having a spring hardness of 10 to 20, wherein lugs are uniformly formed on the outer bottom surface of the ink-occluding layer so as to occupy 15 to 30% of the outer bottom surface area of the ink-occluding layer, each of said lugs comprising a cylinder having a cross-sectional area of 0.12 to 1.13 mm$^2$.

2. A porous rubber stamp material having open cells which comprises a print layer having a spring hardness of greater than or equal to 35 and less than or equal to 40 and an ink-occluding layer having a spring hardness of 10 to 20.

3. The porous rubber stamp material according to claim 2, wherein lugs are uniformly formed on the outer bottom surface of the ink-occluding layer so as to occupy 15 to 30% of the outer bottom surface area of the ink-occluding layer, each of said lugs comprising a cylinder having a cross-section area of 0.12 to 1.13 mm$^2$.

* * * * *